(No Model.)

T. PRENTICE.
PLOW POINT.

No. 530,452. Patented Dec. 4, 1894.

Witnesses
John C. Shaw
J. B. Devens

Inventor
Thomas Prentice,
By his Attorneys.
C. A. Snow & Co.

UNITED STATES PATENT OFFICE.

THOMAS PRENTICE, OF DETROIT, TEXAS, ASSIGNOR OF ONE-HALF TO J. N. NORRIS, OF SAME PLACE.

PLOW-POINT.

SPECIFICATION forming part of Letters Patent No. 530,452, dated December 4, 1894.

Application filed May 18, 1894. Serial No. 511,712. (No model.)

*To all whom it may concern:*

Be it known that I, THOMAS PRENTICE, a citizen of the United States, residing at Detroit, in the county of Red River and State of Texas, have invented a new and useful Plow-Point, of which the following is a specification.

My invention relates to an improvement in that class of plow-points which are adapted for use on shovel or spade plows; and it consists of an attachment which can be applied to the point of these plows and which will operate to more effectually divide the ground and allow the plow to cultivate the hardest and most refractory kinds of soil.

Figure 1:
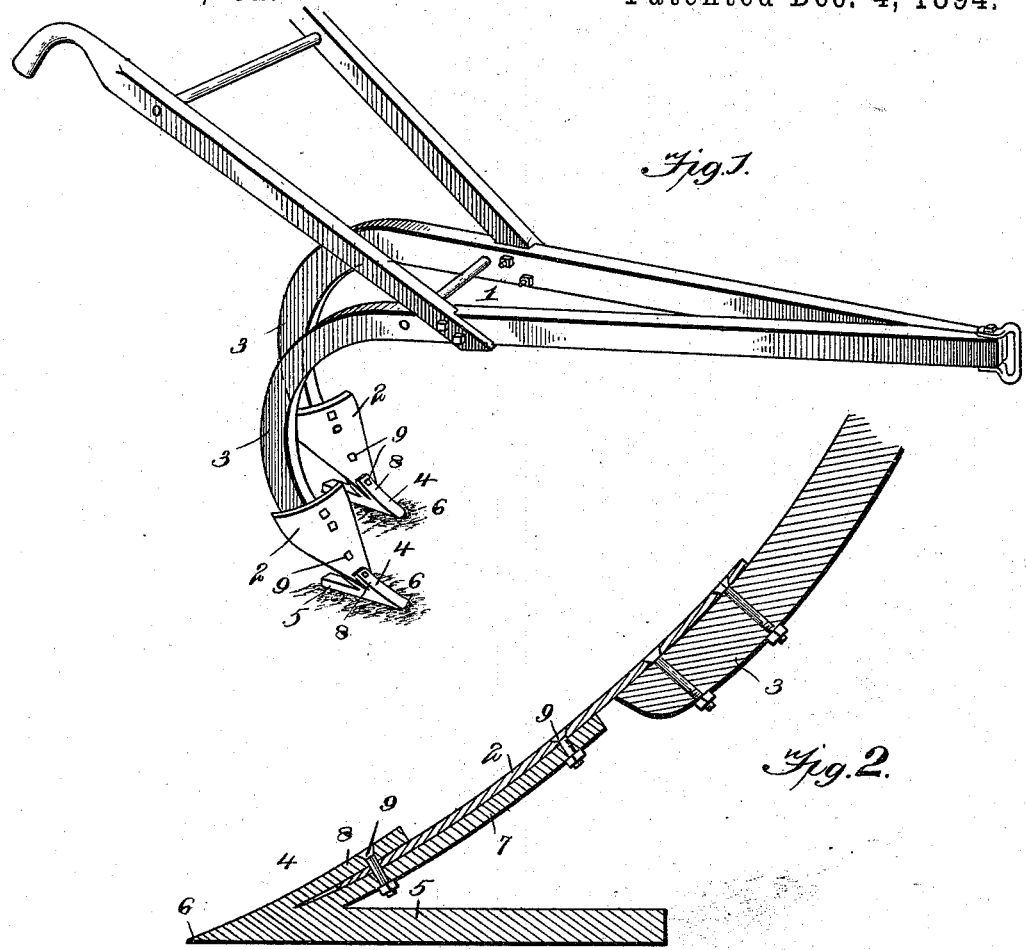
Figure 2:
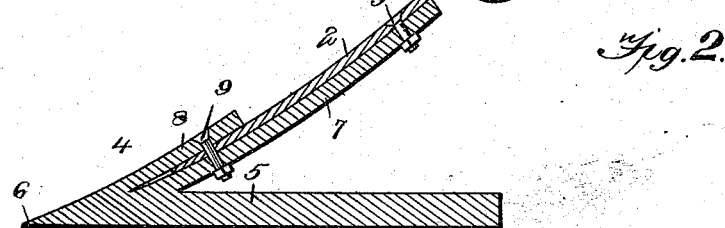
Figure 3:
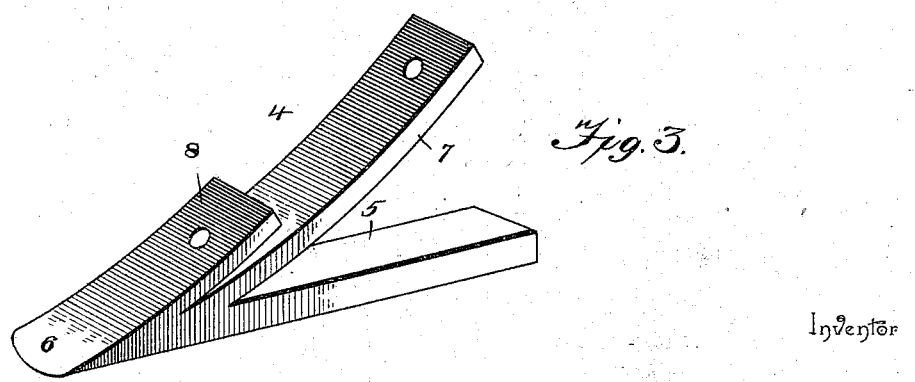

In the drawings: Figure 1 represents a perspective view of my invention, showing it applied; Fig. 2, a vertical longitudinal section; Fig. 3, an enlarged and detailed perspective of the point.

The reference numeral 1 indicates the plow-frame, and this may be of any preferred construction, and 2 the blade which is connected to the frame by the usual beam 3.

4 indicates the point, and this consists of a metallic casting having the main and horizontally-extending portion 5, which terminates in the point 6. Formed integral with the front end of the main portion 5, are the upwardly and rearwardly extending arms 7 and 8, which are parallel with each other and a distance apart equal to about the thickness of the metal composing the blade 2. The arm 7 is the longer and rear arm, and is of a length equal to about the length of the main portion 5. This arm is adapted to lie on the under side of the blade 2, and to be secured rigidly thereto by means of the rivets 9, which are preferably two in number, one passing through the blade only, while the remaining one passes through the blade and through the arm 8. This latter arm is much shorter than the arm 7, and is adapted to embrace the lower front side of the blade 2, and to be securely bolted to the blade and to the arm 7.

The use of my invention is illustrated by Fig. 1, and there it will be seen that the plow having the point attached is used as any other plow of its class. By means of this device the sheet of thin metal comprising the blade 2 is protected from the wear which otherwise attends its operation, and the breaking of the soil made much easier.

When, after extended use, the point becomes worn out, it may be replaced by a new one, and to facilitate this, the rivets 9 should be of the removable class, or, in effect, bolts and nuts. It will be observed that the main portion 5 of the point is always in engagement with the ground, and that during the plowing operation it lies horizontally upon the bottom of the furrow, thereby operating to steady and render secure the blade in its operation.

Having described my invention, what I claim is—

A shovel plow having affixed to the lower front end of its blade a point, consisting of a horizontal main bar adapted to lie flat upon the ground and to support the weight of the blade and its attachments, and having formed integral therewith two upwardly and rearwardly projecting arms arranged in longitudinal alignment, the rearward arm being longer than its companion, and being adapted to lie in the under side of the plow blade, while the remaining arm is adapted to lie upon the front side thereof, and bolts passing through the blade into the arms, whereby the point is secured in place, substantially as described.

In testimony that I claim the foregoing as my own I have hereto affixed my signature in the presence of two witnesses.

THOMAS PRENTICE.

Witnesses:
 LEON DEAN,
 HUGH DEAN.